US009573157B2

United States Patent
Hong et al.

(10) Patent No.: US 9,573,157 B2
(45) Date of Patent: Feb. 21, 2017

(54) PIEZO-PNEUMATIC VALVE DRIVING TYPE DISPENSING PUMP AND METHOD OF DISPENSING VISCOUS LIQUID BY USING THE PUMP

(71) Applicant: PROTEC CO., LTD, Incheon (KR)

(72) Inventors: Seung Min Hong, Incheon (KR); Hansung Lee, Bucheon-si (KR)

(73) Assignee: PROTEC CO., LTD, Incheon (KR)

( * ) Notice: Subject to any disclaimer, the term of this patent is extended or adjusted under 35 U.S.C. 154(b) by 0 days.

(21) Appl. No.: 14/945,209

(22) Filed: Nov. 18, 2015

(65) Prior Publication Data

US 2016/0136664 A1    May 19, 2016

(30) Foreign Application Priority Data

Nov. 18, 2014  (KR) .................. 10-2014-0160690

(51) Int. Cl.
  *B05B 9/04*   (2006.01)
  *B05B 1/30*   (2006.01)
  *B05C 5/02*   (2006.01)
  *F16K 31/122* (2006.01)
  *B05B 17/06*  (2006.01)

(52) U.S. Cl.
  CPC .......... *B05C 5/0225* (2013.01); *B05C 5/0237* (2013.01); *B05B 9/0413* (2013.01); *B05B 17/0607* (2013.01); *F16K 31/1221* (2013.01)

(58) Field of Classification Search
  CPC .. B05C 5/0225; B05C 5/0237; B05B 17/0607; B05B 9/0413; F16K 31/1221
  See application file for complete search history.

(56) References Cited

U.S. PATENT DOCUMENTS

| 5,553,742 | A  | * | 9/1996  | Maruyama ................ B05C 5/02 |
|           |    |   |         | 222/1 |
| 5,733,597 | A  |   | 3/1998  | Schmitkons et al. |
| 7,694,855 | B2 | * | 4/2010  | Chastine ................ B05C 5/001 |
|           |    |   |         | 137/625.44 |
| 9,260,234 | B2 | * | 2/2016  | Ikushima ........... B65D 83/0005 |
| 9,339,839 | B2 | * | 5/2016  | Fliess .................... B05C 5/0225 |
| 2006/0097010 | A1 | * | 5/2006 | Riney .................... B05C 5/001 |
|           |    |   |         | 222/146.5 |
| 2011/0300295 | A1 |   | 12/2011 | Clark et al. |

(Continued)

FOREIGN PATENT DOCUMENTS

| JP | 1995-083344 A  | 3/1995 |
| JP | 1995-062502 B2 | 7/1995 |

(Continued)

*Primary Examiner* — Frederick C Nicolas
(74) *Attorney, Agent, or Firm* — Knobbe Martens Olson & Bear LLP

(57) ABSTRACT

A piezo-pneumatic valve driving type dispensing pump having an improved dispensing speed and a simplified structure, and a method of dispensing a viscous liquid by using the pump. Accordingly, a viscous liquid may be easily dispensed by reciprocating a valve rod inserted into a reservoir storing the viscous liquid, by using an air pressure. In particular, the air pressure may be precisely controlled by opening or closing a flow passage allowing the air to enter or exit, by using a piezoelectric element-based piezoelectric valve. Thus, the valve rod may be operated precisely at a high speed so that an exact amount of the viscous liquid is dispensed at a high speed.

20 Claims, 8 Drawing Sheets

(56) References Cited

U.S. PATENT DOCUMENTS

2015/0367376 A1* 12/2015 Doyle .................. B05C 5/0225
  222/1
2016/0067656 A1* 3/2016 Britcher ............... B01F 5/0077
  222/1

FOREIGN PATENT DOCUMENTS

| KR | 10-1041067 B1 | 6/2011 |
| KR | 10-1100828 B1 | 1/2012 |
| KR | 10-1301107 B1 | 8/2013 |

* cited by examiner

PIEZO-PNEUMATIC VALVE DRIVING TYPE DISPENSING PUMP AND METHOD OF DISPENSING VISCOUS LIQUID BY USING THE PUMP

CROSS-REFERENCE TO RELATED APPLICATION

This application claims the benefit of Korean Patent Application No. 10-2014-0160690, filed on Nov. 18, 2014, in the Korean Intellectual Property Office, the disclosure of which is incorporated herein in its entirety by reference.

BACKGROUND

1. Field

One or more embodiments relate to an apparatus for dispensing liquid, and a method of dispensing a viscous liquid by using the apparatus.

2. Description of the Related Technology

A dispenser supplies a liquid solution such as water, oil, or resin of a predetermined amount and is used in diverse fields, for example, in a semiconductor process or in the medical field.

In particular, a dispenser is frequently used in an underfill process of a semiconductor process, that is, to fill a package of a semiconductor device with a resin. In a process of manufacturing a light emitting diode (LED) device, a dispenser is used in a process of coating a LED chip with a phosphorescent solution which is a mixture of a phosphorescent material and a resin.

In dispensers as described above, a pump receiving a viscous liquid and dispensing a fixed amount of the viscous liquid at an exact position is used as a core device.

Currently, dispensing pumps that use various driving methods are developed. For example, Korean Patent Nos. 10-1041067 (published on Jun. 13, 2011), 10-1100828 (published on Jan. 2, 2012), and 10-1301107 (published on Aug. 27, 2013) discloses related technologies.

SUMMARY

One aspect of the invention provides a liquid dispenser apparatus, which may comprise: a cylinder; a piston operably engaged with the cylinder and configured to slide relative to the cylinder, the cylinder and the piston defining an air chamber; a liquid valve assembly comprising a nozzle and a valve rod with a tip facing the nozzle, the valve rod connected to the piston and configured to move along an axis relative to the nozzle as the piston slides relative to the cylinder; a first air channel connecting the air chamber to a positive air pressure supply; a second air channel connecting the air chamber to a negative air pressure supply; a first piezoelectric valve comprising a first piezoelectric actuator configured to expand and shrink in accordance with a first voltage signal applied thereto, thereby causing to open and close the first air channel for selectively applying positive air pressure to the air chamber from the positive air pressure supply; a second piezoelectric valve comprising a second piezoelectric actuator configured to expand and shrink in accordance with a second voltage signal applied thereto, thereby causing to open and close the second air channel for selectively applying negative air pressure to the air chamber from the negative air pressure supply; electric circuits configured to generate the first voltage signal for applying to the first piezoelectric actuator and further to generate the second voltage signal for applying to the second piezoelectric actuator such that the first and second voltage signals are to alternatingly open the first and second air channels without both being fully open at any time during normal operation, wherein when the first and second voltage signals cause to open the first air channel and to close the second air channel, positive air pressure is applied to the air chamber via the first air channel to move the piston in a first direction, which to cause the tip of the valve rod to move along the axis toward or away from the nozzle for controlling liquid dispensing, wherein when the first and second voltage signals cause to close the first air channel and to open the second air channel, negative air pressure is applied to the air chamber to move the piston in a second direction opposite to the first direction, which to cause the tip of the valve rod to move along the axis toward or away from the nozzle for controlling liquid dispensing.

In the foregoing apparatus, the valve rod may be configured to move toward the nozzle and then pressurize a valve seat of the nozzle for dispensing liquid as negative air pressure is applied to the air chamber to move the piston in the second direction. The liquid dispenser may further comprise a spring configured to apply a resilient force to the piston in the second direction such that the piston moves in the second direction by the resilient force in addition to the negative air pressure applied to the air chamber. The first and second voltage signals may be configured to operate the first and second piezoelectric actuators to open the second air channel only while the first air channel is fully closed during normal operation. The first and second voltage signals may be configured to operate the first and second piezoelectric actuators to open the first air channel only while the second air channel is fully closed during normal operation. The first and the first and second voltage signals may be configured to operate the first and second piezoelectric actuators to fully close the first and second air channels between an opening period of the first air channel and an opening period of the second air channel during normal operation, wherein the opening period of the first air channel is a time span for which the first air channel is substantially open, and the opening period of the second air channel is a time span for which the second air channel is substantially open.

Still in the foregoing apparatus, the first and second voltage signals may be configured to operate the first and second piezoelectric actuators such that the second piezoelectric valve opens and closes the second air channel at least two times while the first piezoelectric valve maintains full closing of the first air channel for a period between two immediately neighboring opening periods of the first air channel, wherein the opening period of the first air channel is a time span for which the first air channel is substantially open. The first and second piezoelectric actuators may be configured to shrink to open the first and second air channels and expand to close the first and second air channels, respectively, wherein the first and second voltage signals are configured to operate the first and second piezoelectric actuators such that the second piezoelectric actuator shrinks and expands at least two times while the first piezoelectric actuator maintains expansion for fully closing the first air channel for the period. The opening period of the first air channel may be longer than an opening period of the second air channel for which the second air channel is substantially open. The electric circuits may comprise at least one processor configured to generate a signal for changing the first voltage signal to adjust a level of expansion and shrinkage of the first piezoelectric actuator when a displacement of the piezoelectric actuator is smaller than a reference value.

Another aspect of the invention provides a method of dispensing liquid, which may comprise: providing the foregoing liquid dispenser apparatus; generating a first voltage signal for applying to the first piezoelectric actuator and a second voltage signal for applying to the second piezoelectric actuator, wherein the first and second voltage signals are to alternatingly open the first and second air channels without both being fully open at any time during normal operation; and applying the first and second voltage signals to the first and second piezoelectric actuators, respectively: to open the first air channel and close the second air channel, thereby applying positive air pressure to the air chamber via the first air channel to move the piston in a first direction, which to cause the tip of the valve rod to move along the axis toward or away from the nozzle for controlling liquid dispensing, and further to open the second air channel and close the first air channel, thereby applying negative air pressure to the air chamber to move the piston in a second direction opposite to the first direction, which to cause the tip of the valve rod to move along the axis toward or away from the nozzle for controlling liquid dispensing.

In the foregoing method, the valve rod moves toward the nozzle and then pressurizes a valve seat of the nozzle for dispensing liquid as negative air pressure is applied to the air chamber to move the piston in the second direction. The liquid dispenser may further comprise a spring applying a resilient force to the piston in the second direction such that the piston moves in the second direction by the resilient force in addition to the negative air pressure applied to the air chamber. The first and second voltage signals may be applied to operate the first and second piezoelectric actuators to open the second air channel only while the first air channel is fully closed during normal operation. The first and second voltage signals may be applied to operate the first and second piezoelectric actuators to open the first air channel only while the second air channel is fully closed during normal operation. The first and the first and second voltage signals may be applied to operate the first and second piezoelectric actuators to fully close the first and second air channels between an opening period of the first air channel and an opening period of the second air channel during normal operation, wherein the opening period of the first air channel is a time span for which the first air channel is substantially open, and the opening period of the second air channel is a time span for which the second air channel is substantially open.

Still in the foregoing method, the first and second voltage signals may be applied to operate the first and second piezoelectric actuators such that the second piezoelectric valve opens and closes the second air channel at least two times while the first piezoelectric valve maintains full closing of the first air channel for a period between two immediately neighboring opening periods of the first air channel, wherein the opening period of the first air channel is a time span for which the first air channel is substantially open. The first and second piezoelectric actuators may shrink to open the first and second air channels and expand to close the first and second air channels, respectively, wherein the first and second voltage signals are configured to operate the first and second piezoelectric actuators such that the second piezoelectric actuator shrinks and expands at least two times while the first piezoelectric actuator maintains expansion for fully closing the first air channel for the period. The opening period of the first air channel may be longer than an opening period of the second air channel for which the second air channel is substantially open. The method may further comprise generating a signal for changing the first voltage signal to adjust a level of expansion and shrinkage of the first piezoelectric actuator when a displacement of the piezoelectric actuator is smaller than a reference value.

One or more embodiments include a piezo-pneumatic valve driving type dispensing pump having an increased dispensing speed and a simplified structure and a method of dispensing a viscous liquid by using the dispensing pump.

Additional aspects will be set forth in part in the description which follows and, in part, will be apparent from the description, or may be learned by practice of the presented embodiments.

According to one or more embodiments, a piezo-pneumatic valve driving type dispensing pump includes: a valve body including an inlet through which a viscous liquid is supplied from the outside, a reservoir storing the viscous liquid received through the inlet, and a discharge outlet through which the viscous liquid stored in the reservoir is discharged; a valve rod inserted into the reservoir so as to pressurize the viscous liquid stored in the reservoir of the valve body to discharge the viscous liquid through the discharge outlet; a pump body including an air chamber that is tightly sealed and a first flow passage and a second flow passage that are connected to the air chamber to transmit an air pressure to the air chamber, wherein the pump body is coupled to the valve body; a piston having at least a portion that is accommodated in the air chamber of the pump body, the piston being movably mounted in the air chamber with respect to the pump body according to the air pressure transmitted through the first flow passage and/or the second flow passage; a first piezoelectric valve including a first piezoelectric actuator whose length is varied according to an applied voltage, and opening or closing the first flow passage according to an operation of the first piezoelectric actuator; and a second piezoelectric valve including a second piezoelectric actuator whose length is varied according to an applied voltage, and opening or closing the second flow passage according to an operation of the second piezoelectric actuator.

According to one or more embodiments, a method of dispensing a viscous liquid stored in a reservoir of a valve body, through a discharge outlet formed in the valve body, by moving a valve rod connected to a piston mounted in an air chamber of a pump body, includes: (a) supplying a viscous liquid to the reservoir of the valve body into which the valve rod is inserted; (b) controlling a first piezoelectric valve including a first piezoelectric actuator whose length is varied according to an applied voltage and opening or closing a first flow passage connected to the air chamber via an operation of the first piezoelectric actuator, so as to open the first flow passage, and controlling a second piezoelectric valve including a second piezoelectric actuator whose length is varied according to an applied voltage and opening or closing a second flow passage connected to the air chamber via an operation of the second piezoelectric actuator, so as to block the second flow passage; (c) transmitting an air pressure to the air chamber through the first flow passage so as to move the piston and the valve rod in a first direction; (d) controlling the first piezoelectric valve to block the first flow passage, and controlling the second piezoelectric valve to open the second flow passage; and (e) moving the piston and the valve rod in a second direction opposite to the first direction by reducing the air pressure of the air chamber by discharging the air from the air chamber through the second flow passage.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The inventive concept will now be described more fully with reference to the accompanying drawings, in which embodiments of the inventive concept are shown.

Figure 1:
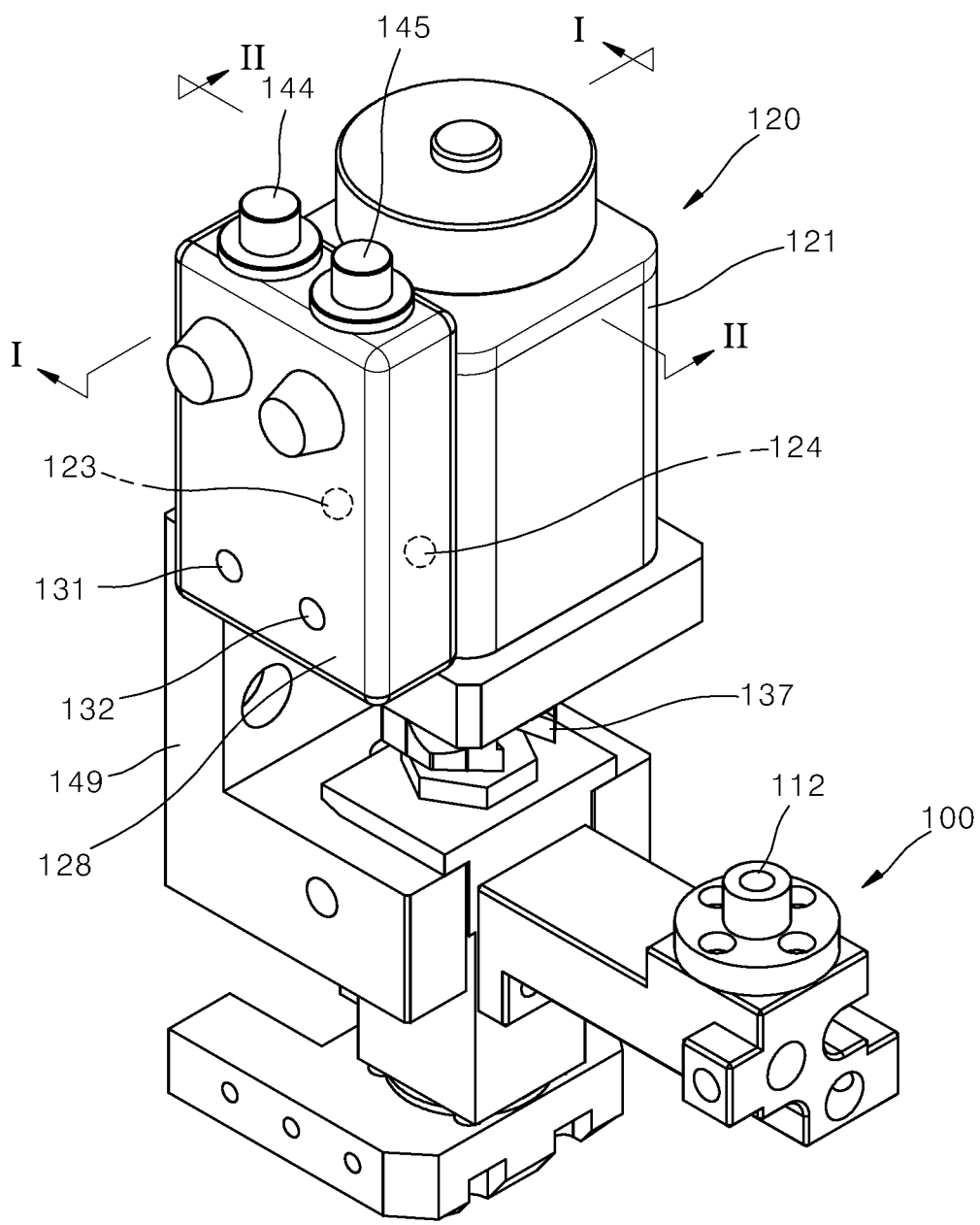
FIG. 1 is a perspective view illustrating major elements of a piezo-pneumatic valve driving type dispensing pump according to an embodiment of the inventive concept.
Figure 2:
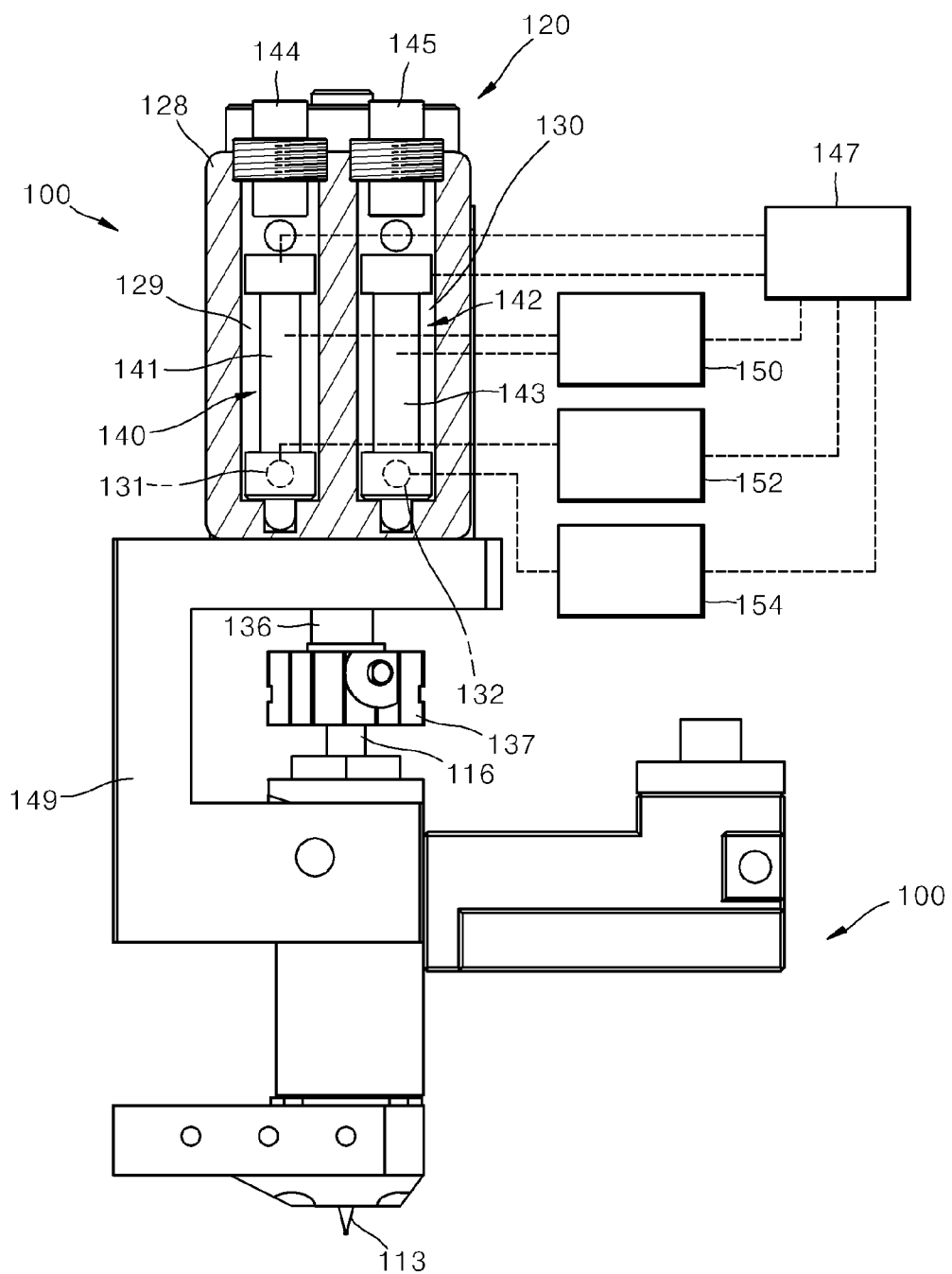
FIG. 2 is a cross-sectional view of a portion of the piezo-pneumatic valve driving type dispensing pump according to an embodiment of the inventive concept.
Figure 3:
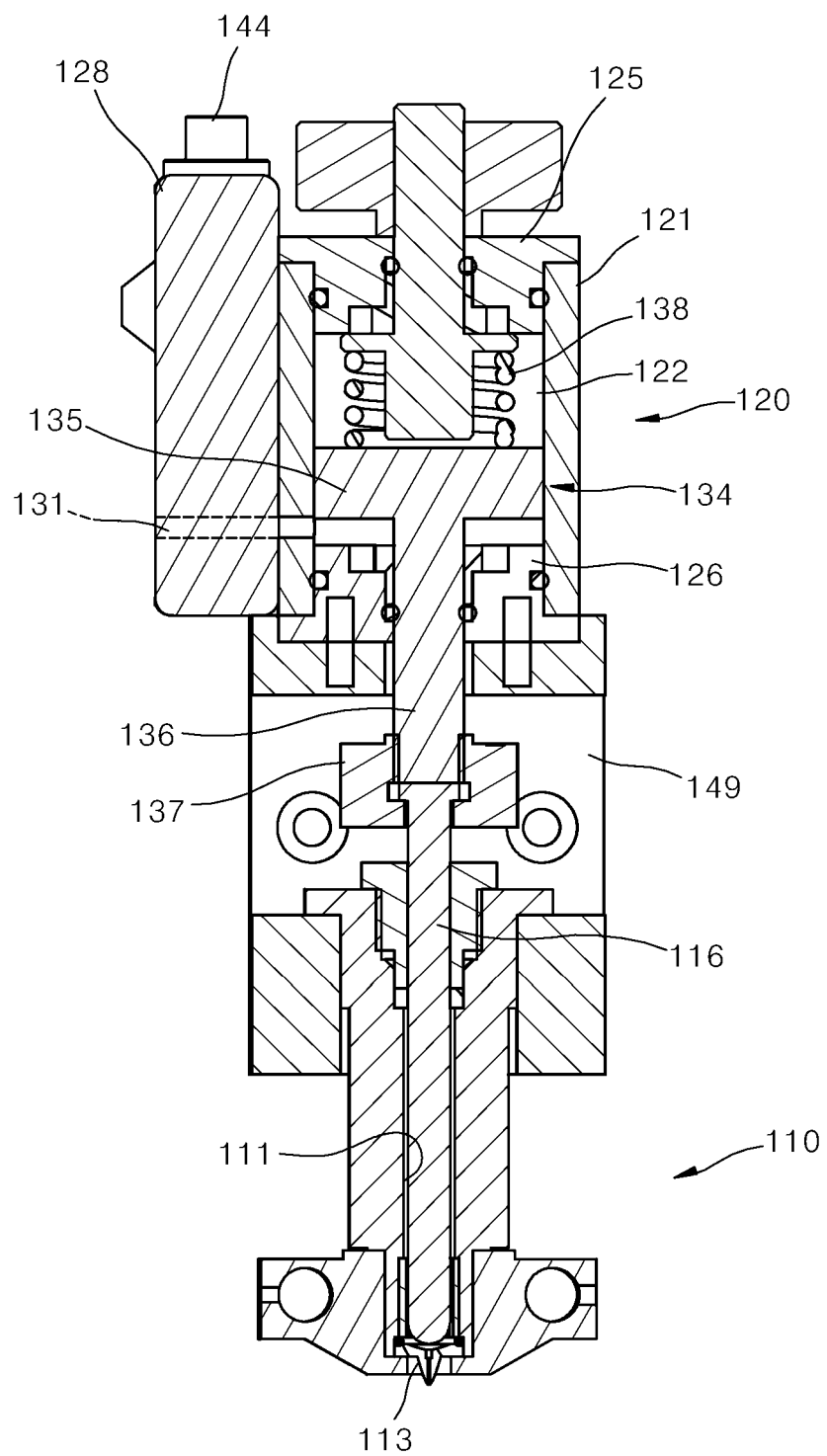
FIG. 3 is a cross-sectional view of the piezo-pneumatic valve driving type dispensing pump cut along a line I-I of FIG. 1.
Figure 4:
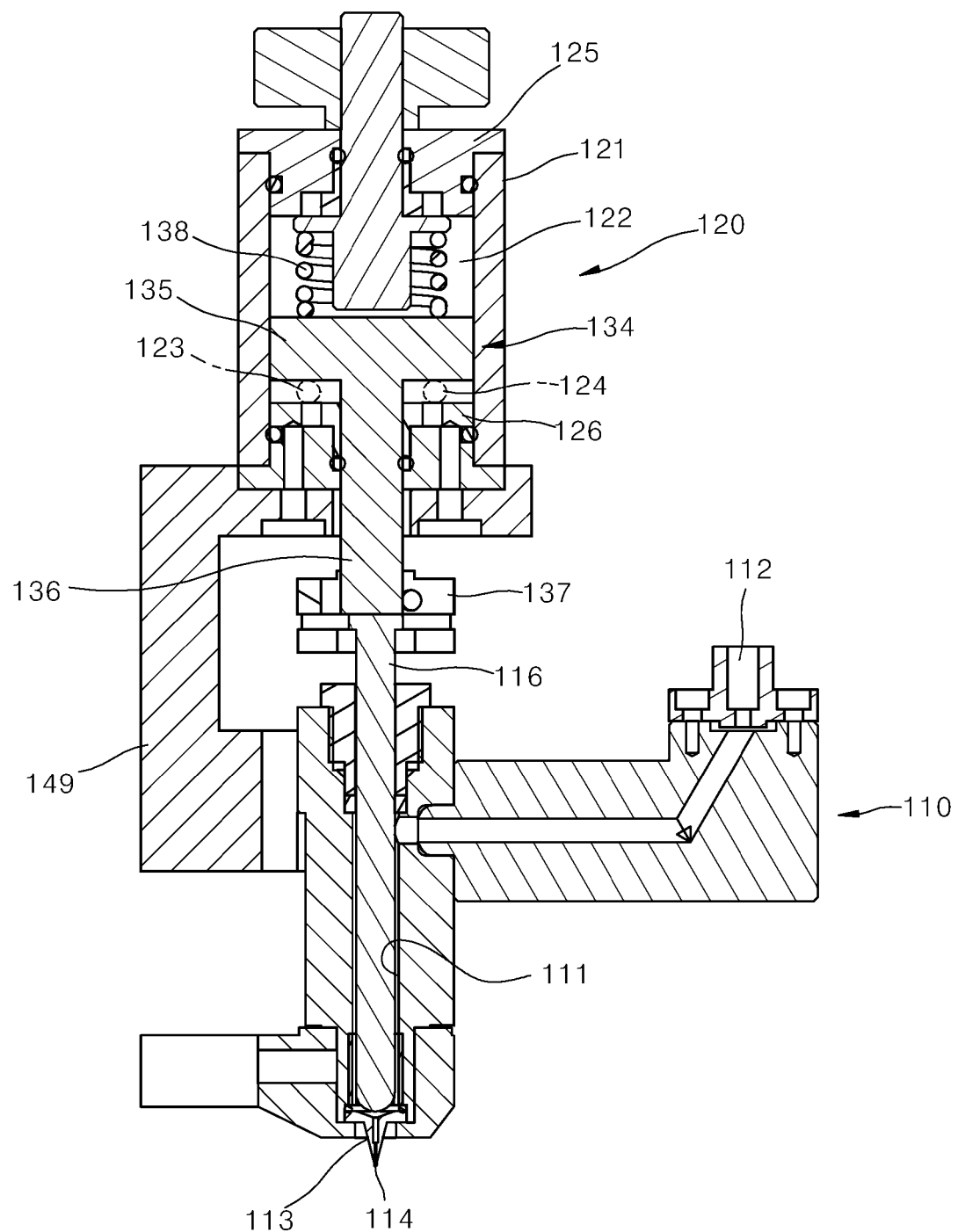
FIG. 4 is a cross-sectional view of the piezo-pneumatic valve driving type dispensing pump cut along a line II-II of FIG. 1.

FIG. 1 is a perspective view illustrating major components of a piezo-pneumatic valve driving type dispensing pump 100 according to an embodiment of the inventive concept. FIG. 2 is a cross-sectional view of a portion of the piezo-pneumatic valve driving type dispensing pump 100 according to an embodiment of the inventive concept. FIG. 3 is a cross-sectional view of the piezo-pneumatic valve driving type dispensing pump 100 cut along a line I-I of FIG. 1. FIG. 4 is a cross-sectional view of the piezo-pneumatic valve driving type dispensing pump 100 cut along a line II-II of FIG. 1.

Referring to FIGS. 1 through 4, the piezo-pneumatic valve driving type dispensing pump 100 according to an embodiment of the inventive concept includes a valve body 110, a valve rod 116, a pump body 120, a piston 134, first and second piezoelectric valves 140 and 142, and a controller 147. The valve body 110 and the pump body 120 are connected to each other via a connection member 149.

The valve body 110 includes a reservoir 111, an inlet 112, and a nozzle 113. The reservoir 111 is formed in the form of a container that is upwardly opened, and the valve rod 116 is inserted into the reservoir 111 to tightly seal an upper portion of the reservoir 111. The inlet 112 is connected to the reservoir 111. A viscous liquid supplied from the outside through the inlet 112 is transmitted to the reservoir 111. The viscous liquid of the reservoir 111 is discharged to the outside through a discharge outlet 114 of the nozzle 113.

The pump body 120 includes a piston housing 121 in which a piston 134 is mounted and a piezoelectric valve housing 128 in which the first and second piezoelectric valves 140 and 142 are mounted. The piston housing 121 includes an air chamber 122, a first flow passage 123, and a second flow passage 124. A top cover 125 and a bottom cover 126 are respectively coupled to an upper portion and a lower portion of the piston housing 121 so as to tightly seal upper and lower portions of the air chamber 122. The first flow passage 123 is connected to the air chamber 122 so as to allow air to flow into the air chamber 122. The second flow passage 124 is connected to the air chamber 122 so as to exhaust the air from the air chamber 122.

The piezoelectric valve housing 128 is coupled to the piston housing 121 so as to cover the first flow passage 123 and the second flow passage 124 of the piston housing 121. The piezoelectric valve housing 128 includes a first connection chamber 129 connected to the first flow passage 123 of the piston housing 121, a second connection chamber 130 connected to the second flow passage 124 of the piston housing 121, a first passage 131 connected to the first connection chamber 129, and a second passage 132 connected to the second connection chamber 130. In embodiments, the first passage 131 and the first flow passage 123 form a first air channel which can be open and closed by a piezoelectric valve 140. The second passage 132 and the second flow passage 124 form a second air channel which can be open and closed by a piezoelectric valve 142.

Referring to FIGS. 3 and 4, the piston 134 is movably mounted in the air chamber 122 with respect to the pump body 120 according to an air pressure transmitted through the first flow passage 123 and/or the second flow passage 124. The piston 134 includes a head portion or piston 135 and a rod portion 136 extending downwards from the head portion 135. An outer circumferential surface of the head portion 135 of the piston 134 is closely adhered to an inner circumferential surface of the piston housing 121 so that the head portion 135 partitions the air chamber 122 into two spaces, a upper space (or an upper air chamber) and a lower space (a lower air chamber). No air flows between the two spaces partitioned by the head portion 135 of the piston 134. As illustrated in FIG. 4, the first flow passage 123 and the second flow passage 124 are fluidically connected to the lower space among the two spaces partitioned by the head portion 135 of the piston 134. Air injected through the first flow passage 123 is filled in the lower space below the head portion 135. The rod portion 136 of the piston 134 is inserted into a through hole in a middle of the bottom cover 126 to tightly seal the through hole and protrude from the air chamber 122 to the outside. The rod portion 136 of the piston 134 is coupled to the valve rod 116 via a coupling member 137. Accordingly, the valve rod 116 is moved with the piston 134.

An elastic member 138 is mounted in the air chamber 122 of the piston housing 121. The elastic member 138 is mounted in the upper space among the two spaces inside the air chamber 122 partitioned by the head portion 135 of the piston 134. The elastic member 138 provides an elastic force with respect to the piston 134 in a direction in which the valve rod 116 is pressurized towards the discharge outlet 114 of the valve body 110. Consequently, the piston 134 reciprocates vertically in the air chamber 122 due to an air pressure of the air chamber 122 and an elastic force of the elastic member 138. Sizes of the two spaces in the air chamber 122 partitioned by the head portion 135 are changed according to movement of the piston 134 as described above. When air is injected into the air chamber 122 through the first flow passage 123 to lift the piston 134, the lower space below the piston 134 is extended, and when the piston 134 is lowered by the elastic member 138, the lower space below the piston 134 is reduced.

Figure 5:
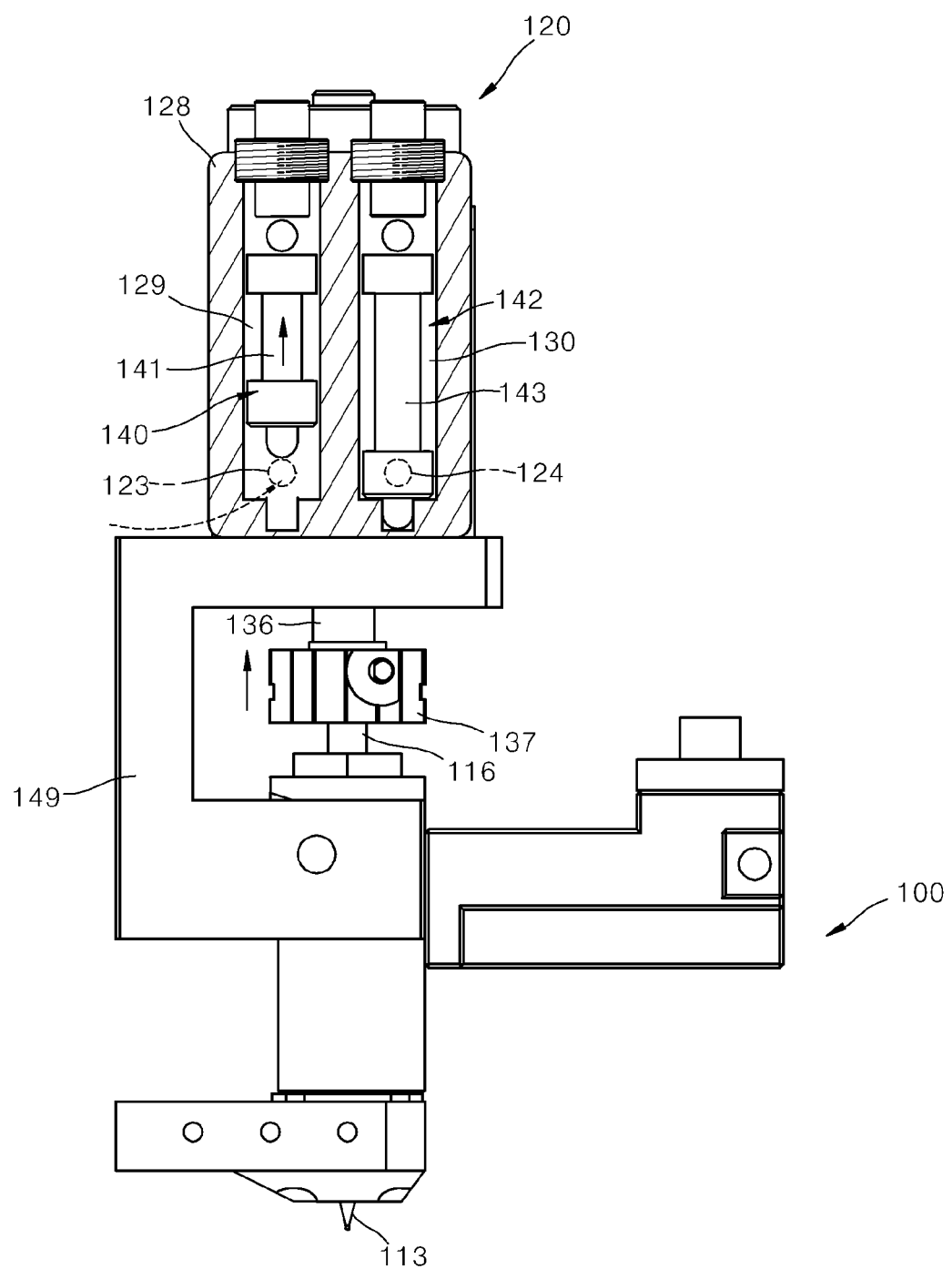
FIGS. 5 and 6 are diagrams for describing an operation of a piezo-pneumatic valve driving type dispensing pump according to an embodiment of the inventive concept.
Figure 6:
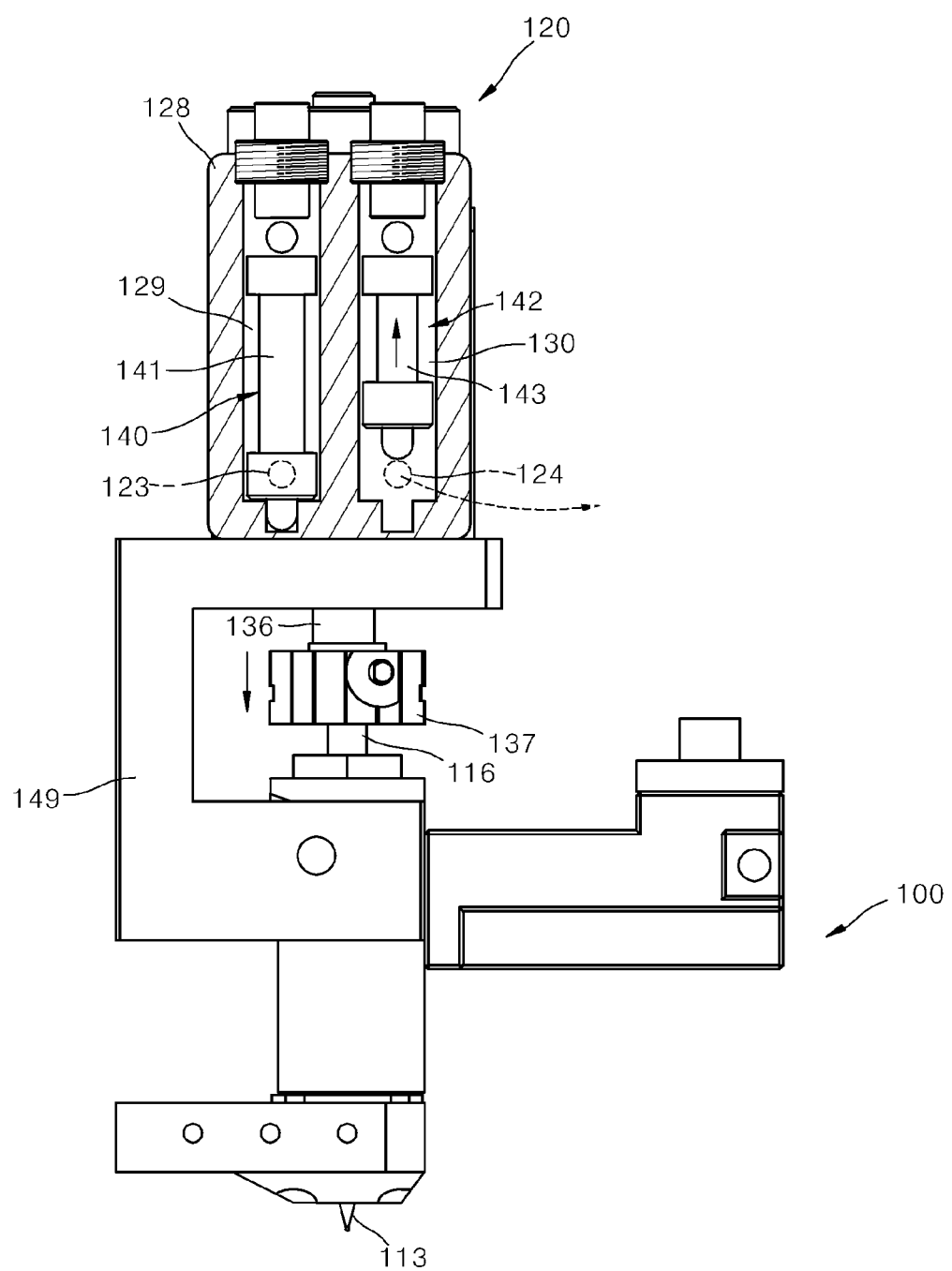
Figure 7:
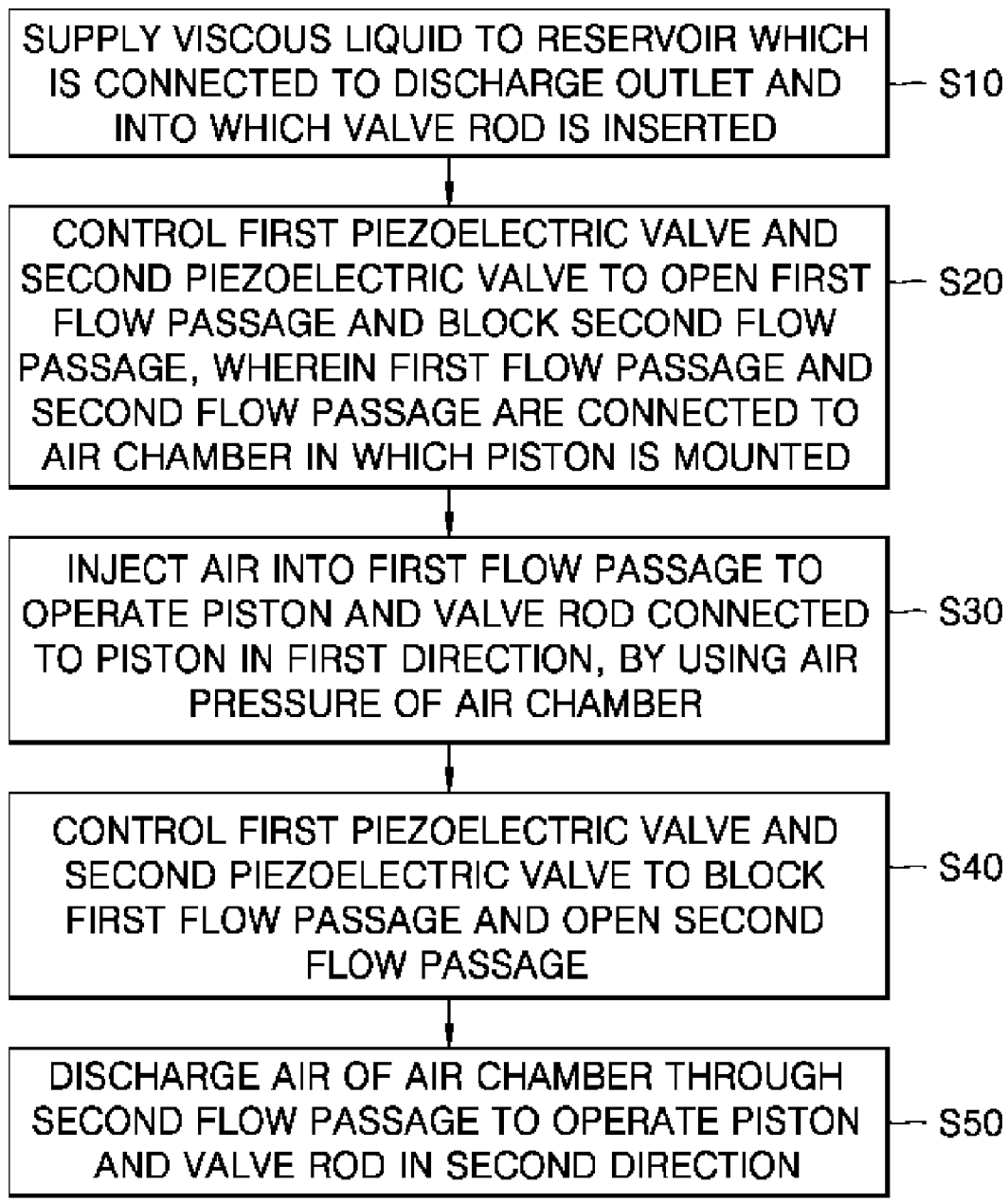
FIG. 7 is a flowchart of a method of dispensing a viscous liquid by using a piezo-pneumatic valve driving type dispensing pump according to an embodiment of the inventive concept.

Referring to FIGS. 5 and 6, the first piezoelectric valve 140 is mounted in the first connection chamber 129 of the piezoelectric valve housing 128 to open or close the first flow passage 123 of the piston housing 121. The second piezoelectric valve 142 is mounted in the second connection chamber 130 to open or close the second flow passage 124 of the piston housing 121. The first piezoelectric valve 140 includes a first piezoelectric actuator 141 whose length is varied according to an applied voltage, and the second piezoelectric valve 142 includes a second piezoelectric actuator 143 whose length is varied according to an applied voltage. In embodiments, the first piezoelectric valve 140 and the second piezoelectric valve 142 are each formed of a piezoelectric element, a length of which is increased or reduced according to a difference in an electrical potential of a voltage applied thereto. The first piezoelectric actuator 141 and the second piezoelectric actuator 143 may have a multi-stack structure in which multiple piezoelectric elements are stacked so as to increase a total amount of deformation thereof.

Operations of the first piezoelectric valve 140 and the second piezoelectric valve 142 are controlled by the controller 147. The controller 147 applies a voltage having various pulse waveforms to the first piezoelectric actuator 141 and the second piezoelectric actuator 143 according to time, thereby controlling deformation of each of the first piezoelectric actuator 141 and the second piezoelectric actuator 143.

Referring to FIGS. 1 and 2, a first position adjustor 144 and a second position adjustor 145 are respectively arranged at respective upper ends of the first piezoelectric valve 140 and the second piezoelectric valve 142. The first position adjustor 144 and the second position adjustor 145 are screw-coupled to the piezoelectric valve housing 128 while respective ends of the first position adjustor 144 and the second position adjustor 145 are in contact with respective ends of the first piezoelectric actuator 141 and the second piezoelectric actuator 143. By using the first position adjustor 144 and the second position adjustor 145, respective positions of the first position adjustor 144 and the second position adjustor 145 may be adjusted. When the first piezoelectric actuator 141 is pressurized by tightening the first position adjustor 144, the first piezoelectric actuator 141 is lowered. The second position adjustor 145 also adjusts a position of the second piezoelectric actuator 143 in the same manner as the first position adjustor 144.

The first and second piezoelectric actuators 141 and 143 are typically formed of a ceramic material. Expansion displacement of the first and second piezoelectric actuators 141 and 143 according to an applied voltage may be changed from an initial expansion displacement thereof due to the characteristics of the material after usage for a long period of time. In this case, opening and closing characteristics of the first and second piezoelectric actuators 141 and 143 with respect to the first flow passage 123 and the second flow passage 124 of the pump body 120 may be maintained by adjusting the positions of the first piezoelectric actuator 141 and the second piezoelectric actuator 143 by using the first position adjustor 144 and the second position adjustor 145.

As illustrated in FIG. 2, a displacement sensor 150 is connected to the first piezoelectric actuator 141 and the second piezoelectric actuator 143. The displacement sensor 150 detects an amount of deformation of each of the first piezoelectric actuator 141 and the second piezoelectric actuator 143 to provide the controller 147 with a detection signal corresponding to the amount of deformation of each of the first and second piezoelectric actuators 141 and 143. The controller 147 receives the detection signal from the displacement sensor 150 to control voltages to be applied to the first piezoelectric actuator 141 and the second piezoelectric actuator 143, thereby adjusting opening and closing characteristics of the first flow passage 123 and the second flow passage 124 of the pump body 120 according to operations of the first piezoelectric actuator 141 and the second piezoelectric actuator 143. The first piezoelectric valve 140 may include a sealing member that is coupled to the first piezoelectric actuator 141 so as to stably tightly seal the first flow passage 123. Likewise, the second piezoelectric valve 142 may include a sealing member that is coupled to the second piezoelectric actuator 143 so as to stably tightly seal the second passage 124.

Referring to FIGS. 1 and 2, the first passage 131 of the piezoelectric valve housing 128 is connected to the first flow passage 123 of the pump body 120 via the first connection chamber 129 in the piezoelectric valve housing 128. As illustrated in FIG. 2, the second passage 132 of the piezoelectric valve housing 128 is connected to the second flow passage 124 of the pump body 120 via the second connection chamber 130. A first pump 152 is connected to the first passage 131 of the piezoelectric valve housing 128, and a second pump 154 is connected to the second passage 132 of the piezoelectric valve housing 128. The first pump 152 supplies a compressed air to the air chamber 122 of the pump body 120 through the first passage 131, the first connection chamber 129, and the first flow passage 123 to thereby transmit a positive air pressure to the air chamber 122. The second pump 154 transmits a negative air pressure to the air chamber 122 of the pump body 120 through the second passage 132, the second connection chamber 130, and the second flow passage 124. While an air pressure of the air chamber 122 is raised as the compressed air is injected into the air chamber 122 of the pump body 120, when the second flow passage 124 of the pump body 120 is opened, the air of the air chamber 122 is spontaneously discharged to the outside. When the air of the air chamber 122 is absorbed using the second pump 154 while the second flow passage 124 of the pump body 120 is opened, the air may be quickly discharged from the air chamber 122.

Hereinafter, a method of dispensing a viscous liquid by using the piezo-pneumatic valve driving type dispensing pump 100 according to the present embodiment will be described with reference to FIGS. 1 through 7.

First, a viscous liquid to be dispensed is supplied to the reservoir 111 through the inlet 112 of the valve body 110 (S10, step (a)).

While the viscous liquid is filled in the reservoir 111, the controller 147 controls voltages to be applied to the first piezoelectric valve 140 and the second piezoelectric valve 142 to adjust amounts of deformation of the first piezoelectric actuator 141 and the second piezoelectric actuator 143 to thereby open the first flow passage 123 of the pump body 120 and block the second flow passage 124 of the pump body 120 (S20, step (b)). In embodiments, as illustrated in FIG. 5, the controller 147 controls a voltage to be applied to the first piezoelectric valve 140 to contract a length of the first piezoelectric actuator 141, thereby opening the first flow passage 123 of the pump body 120. At the same time, the controller 147 controls a voltage to be applied to the second piezoelectric valve 142 to increase a length of the second piezoelectric actuator 143, thereby blocking the second flow passage 124 of the pump body 120.

As illustrated in FIG. 5, when the first flow passage 123 of the pump body 120 is opened, the first pump 152 transmits a positive pressure to the air chamber 122 through the first flow passage 123 so as to operate the piston 134 and the valve rod 116 in a first direction (S30, step (c)). In embodiments, by increasing an air pressure of the air chamber 122 to a predetermined level or higher by injecting a compressed air into the air chamber 122, an elastic force of the elastic member 138 is overcome and the piston 134 and the valve rod 116 are lifted in the first direction. The first direction denotes a direction in which the valve rod 116 is away from the discharge outlet 114 of the valve body 110 (that is, an upward direction of FIG. 5).

Next, the controller 147 controls voltages to be respectively applied to the first piezoelectric valve 140 and the second piezoelectric valve 142 so as to block the first flow passage 123 of the pump body 120 and open the second flow passage 124 of the pump body 120 (S40, step (d)). In embodiments, as illustrated in FIG. 6, the controller 147 controls a voltage to be applied to the first piezoelectric valve 140 to increase a length of the first piezoelectric actuator 141, thereby blocking the first flow passage 123 of the pump body 120. At the same time, the controller 147 controls a voltage to be applied to the second piezoelectric valve 142 to contract a length of the second piezoelectric actuator 143, thereby opening the second flow passage 124 of the pump body 120.

After the second flow passage 124 of the pump body 120 is opened as described above, the second pump 154 forcibly exhausts the air from the air chamber 122 to reduce a pressure of the air chamber 122, thereby operating the piston 134 and the valve rod 116 in a second direction (S50, step (e)). When the second pump 154 discharges the air of the air chamber 122 to reduce an air pressure of the air chamber 122, the elastic member 138 that has been compressed is elastically restored to help movement of the piston 134 and the valve rod 116. The second direction is opposite to the first direction described above, and denotes a direction in which the valve rod 116 is pressurized towards the discharge outlet 114 of the valve body 110 (a downward direction of FIG. 6). In regard to exhaust of the air of the air chamber 122 through the second flow passage 124 of the pump body 120, the air may be quickly discharged from the air chamber 122 when the second pump 154 transmits a negative pressure to the air chamber 122. As a result, movement of the piston 134 in the second direction is accelerated.

As described above, a viscous liquid is discharged by reciprocating the piston 134 and the valve rod 116 in the reservoir 111 of the valve body 110. The respective operations described above are controlled by the controller 147. The controller 147 controls, for example, an amount of air to be injected into the air chamber 122 each time, an air injection speed, an opening degree of valve of the first flow passage 123 via the first piezoelectric valve 140, and an opening degree of valve of the second flow passage 124 via the second piezoelectric valve 142. As the controller 147 adjusts a movement displacement or a movement speed of the piston 134 and the valve rod 116, dispensing characteristics of a viscous liquid such as a discharge amount or a discharge speed of the viscous liquid or the like may be variously modified.

Meanwhile, the controller 147 receives amounts of deformation of the first piezoelectric actuator 141 and the second piezoelectric actuator 143 in real time during dispensing of a viscous liquid to thereby control voltages to be applied to the first piezoelectric actuator 141 and the second piezoelectric actuator 143. When used for a long period of time, the amounts of deformation of the first piezoelectric actuator 141 and the second piezoelectric actuator 143 may be changed from initial amounts of deformation thereof according to applied voltages due to damages to components or degraded performance of the first piezoelectric actuator 141 and the second piezoelectric actuator 143. The controller 147 may receive a detection signal corresponding to the amounts of deformation of the first and second piezoelectric actuators 141 and 143, and if the amounts of deformation of the first and second piezoelectric actuators 141 and 143 are different from the initial amounts of deformation thereof, the controller 147 may maintain the initial amounts of deformation of the first and second piezoelectric actuators 141 and 143 by, for example, adjusting the applied voltages. In addition, the controller 147 may receive a detection signal corresponding to the amounts of deformation of the first and second piezoelectric actuators 141 and 143 from the displacement sensor 150, and if performance of the first and second piezoelectric actuators 141 and 143 is excessively degraded or the first and second piezoelectric actuators 141 and 143 no longer operate, the controller 147 may stop a dispensing operation of a viscous liquid to thereby avoid or minimize an wasted amount due to incorrect dispensing of a viscous liquid.

As described above, according to the piezo-pneumatic valve driving type dispensing pump 100 of the present embodiment, a viscous liquid may be easily dispensed by reciprocating (lifting or lowering) the valve rod 116 inserted into the reservoir 111 storing the viscous liquid, by using the air pressure. In particular, the air pressure may be precisely controlled by opening or closing the first flow passage 123 and the second flow passage 124 by using the piezoelectric element-based first and second piezoelectric valves 140 and 142. According to the embodiments, the valve rod 116 may be precisely operated at a high speed so that a viscous liquid is dispensed at a high speed, and a discharge amount of the viscous liquid may be precisely adjusted.

In embodiments, the liquid dispensing apparatus includes a first piezoelectric valve includes a first piezoelectric actuator configured to expand and shrink in accordance with a first voltage signal applied thereto, thereby causing to open and close the first air channel for selectively applying positive air pressure to the air chamber from the positive air pressure supply. The liquid dispensing apparatus includes second piezoelectric valve comprising a second piezoelectric actuator configured to expand and shrink in accordance with a second voltage signal applied thereto, thereby causing to open and close the second air channel for selectively applying negative air pressure to the air chamber from the negative air pressure supply.

The liquid dispensing apparatus includes voltage signal supply circuits which generates the first voltage signal for applying to the first piezoelectric actuator and further to generate the second voltage signal for applying to the second piezoelectric actuator. In one embodiment, each of the voltage signals may have a sinusoidal waveform, a square waveform or a trapezoidal waveform, but the invention is not limited thereto.

In embodiments, when the first and second voltage signals cause to open the first air channel and to close the second air channel, positive air pressure is applied to the air chamber via the first air channel to move the piston in a first direction, which to cause the tip of the valve rod to move along the axis toward or away from the nozzle for controlling liquid dispensing. Further, when the first and second voltage signals cause to close the first air channel and to open the second air channel, negative air pressure is applied to the air chamber to move the piston in a second direction opposite to the first direction, which to cause the tip of the valve rod to move along the axis toward or away from the nozzle for controlling liquid dispensing.

In embodiments, the first and second voltage signals are to alternatingly open the first and second air channels without both being fully open at any time during normal operation. In one embodiment, the first and second voltage signals operate the first and second piezoelectric actuators to open the second air channel only while the first air channel is fully closed during normal operation. Further, the first and second voltage signals operate the first and second piezoelectric actuators to open the first air channel only while the second air channel is fully closed during normal operation. In another embodiment, the first and the first and second voltage signals operate the first and second piezoelectric actuators to fully close the first and second air channels between an opening period of the first air channel and an opening period of the second air channel during normal operation. In embodiments, the opening period of the first air channel is defined by a time span for which the first air channel is substantially open, and the opening period of the second air channel may be defined by a time span for which the second air channel is substantially open.

In embodiments, the first and second voltage signals may be configured to operate the first and second piezoelectric actuators such that the second piezoelectric valve opens and closes the second air channel at least two times while the first piezoelectric valve maintains full closing of the first air channel for a period between two immediately neighboring opening periods of the first air channel. In embodiments, the opening and closing of the second air channel may be repeated two times, three times or more than three times. For this operation, the first and second piezoelectric actuators shrink to open the first and second air channels and expand to close the first and second air channels, respectively. The first and second voltage signals operate the first and second piezoelectric actuators such that the second piezoelectric actuator shrinks and expands at least two times while the first piezoelectric actuator maintains expansion for fully closing the first air channel for the period. The opening period of the first air channel may be longer than an opening period of the second air channel for which the second air channel is substantially open.

While the embodiments of the inventive concept have been described above, the scope of the inventive concept is not limited to the described and illustrated embodiments.

For example, although the elastic member 138 is illustrated as being mounted on the pump body 120 in order to move the piston 134 that has been moved by the air pressure transmitted to the air chamber 122 of the pump body 120, in an opposite direction to a direction in which the piston 134 has been moved, the elastic member 138 may be omitted. In this case, a positive air pressure may be transmitted to the air chamber via the first pump so as to lift the piston, and a negative air pressure may be transmitted to the air chamber via the second pump so as to lower the piston.

In addition, although the first flow passage 123 and the second flow passage 124 are illustrated as both being fluidically connected to the space below the piston 134 among the two internal spaces of the piston housing 121 partitioned by the piston 134 in the drawings, the first flow passage and the second flow passage may also be respectively connected to different spaces partitioned by the piston. In this case, the first pump may transmit the air pressure to the air chamber through the first flow passage so as to move the piston in one direction, and the second pump may transmit the air pressure to the air chamber through the second flow passage so as to move the piston in an opposite direction to the above one direction. In this modified embodiment, the elastic member may be omitted.

In addition, while the piston 134 is illustrated as moving the valve rod 116 is away from the discharge outlet 114, by using the air pressure of the air chamber 122, and the piston 134 is illustrated as moving the valve rod 116 via the elastic member 138 in a direction in which the valve rod 116 is pressurized towards the discharge outlet 114, in the drawings, a direction of movement of the piston 134 due to the air pressure of the air chamber 122 and a direction of movement of the piston 134 due to an elastic force of the elastic member 138 may be exchanged. In embodiments, the air pressure of the air chamber may move the valve rod towards the discharge outlet, and the elastic member may move the valve rod in a direction away from the discharge outlet.

In addition, while the pump 120 is illustrated as having two housings 121 and 128 in the drawings, the pump body may also have a structure including a single housing in which a piston and a piezoelectric valve are both mounted.

Also, while the first flow passage 123 and the second flow passage 124 are illustrated as being blocked as the lengths of the first piezoelectric valve 140 and the second piezoelectric valve 142 are increased, and the first flow passage 123 and the second flow passage 124 are illustrated as being opened as the lengths of the first piezoelectric valve 140 and the second piezoelectric valve 142 are reduced in the drawings, the opposite configuration is also possible. In embodiments, by appropriately modifying the structure and arrangement of the first piezoelectric valve and the second piezoelectric valve, the first flow passage and the second flow passage may be respectively opened every time when the lengths of the piezoelectric valves are increased, and the first flow passage and the second flow passage may be respectively blocked every time when the lengths of the piezoelectric valves are reduced.

In addition, while the air is described above as being forcibly exhausted from the air chamber 122 of the pump body 120 by using the second pump 154, the air of the air chamber 122 may also be spontaneously exhausted by opening or closing the second flow passage without using the second pump.

Figure 8:
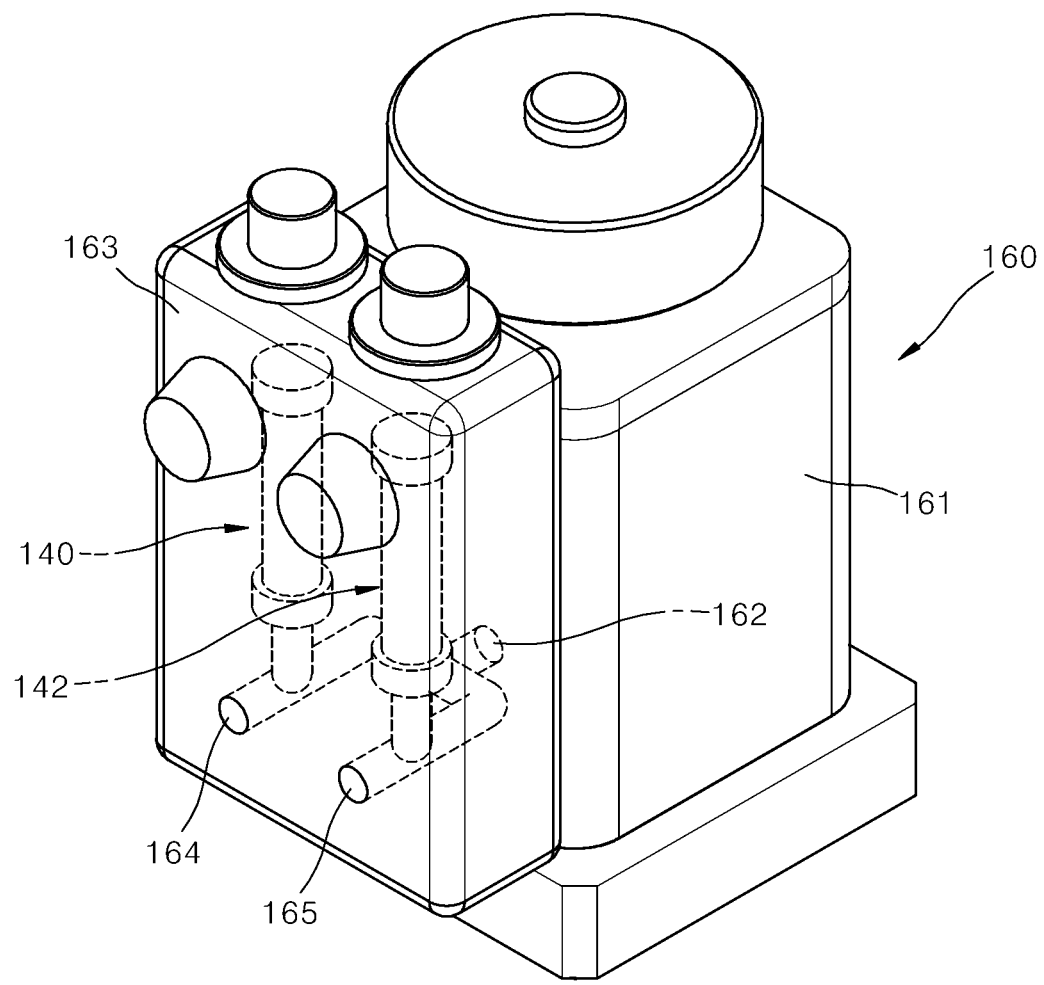
FIG. 8 illustrates a pump body according to another embodiment.

Also, the structure of the air passages connected to the air chamber 122 of the pump body 120 is not limited to the structure illustrated in the drawings but may be modified in various structures. For example, a pump body 160 may have a flow passage structure as shown in FIG. 8. In the pump body 160 illustrated in FIG. 8, one through hole 162 connected to the air chamber 122 (see FIG. 2) is formed in a piston housing 161 in which the piston 134 (see FIG. 2) is mounted, and formed such that a first flow passage 164 and a second flow passage 165 extend up to the through hole 162 in a piezoelectric valve housing 163. The first piezoelectric valve 140 and the second piezoelectric valve 142 are mounted in the piezoelectric valve housing 163 to respectively open or close the first flow passage 164 and the second flow passage 165. The pump body 160 may supply compressed air to the air chamber 122 or exhaust the air from the air chamber 122 through the one through hole 162 formed in the piston housing 161.

According to the piezo-pneumatic valve driving type dispensing pump of the embodiments, by reciprocating a valve rod inserted into a reservoir storing a viscous liquid, by using an air pressure, the viscous liquid may be easily dispensed. In particular, the air pressure may be precisely controlled by opening or closing a flow passage allowing the air to enter or exit by using a piezoelectric element-based piezoelectric valve. Thus, as the valve rod is precisely operated at a high speed, an exact amount of the viscous liquid may be dispensed at a high speed.

In addition, the piezo-pneumatic valve driving type dispensing pump of the embodiments has a simple structure, and thus the possibility of breakdown of the pump is reduced, and durability thereof is high.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A liquid dispenser comprising:
   a cylinder;
   a piston operably engaged with the cylinder and configured to slide relative to the cylinder, the cylinder and the piston defining an air chamber;
   a liquid valve assembly comprising a nozzle and a valve rod with a tip facing the nozzle, the valve rod connected to the piston and configured to move along an axis relative to the nozzle as the piston slides relative to the cylinder;
   a first air channel connecting the air chamber to a positive air pressure supply;
   a second air channel connecting the air chamber to a negative air pressure supply;
   a first piezoelectric valve comprising a first piezoelectric actuator configured to expand and shrink in accordance with a first voltage signal applied thereto, thereby causing to open and close the first air channel for selectively applying positive air pressure to the air chamber from the positive air pressure supply;
   a second piezoelectric valve comprising a second piezoelectric actuator configured to expand and shrink in accordance with a second voltage signal applied thereto, thereby causing to open and close the second air channel for selectively applying negative air pressure to the air chamber from the negative air pressure supply;
   electric circuits configured to generate the first voltage signal for applying to the first piezoelectric actuator and further to generate the second voltage signal for applying to the second piezoelectric actuator such that the first and second voltage signals are to alternatingly open the first and second air channels without both being fully open at any time during normal operation,
   wherein when the first and second voltage signals cause to open the first air channel and to close the second air channel, positive air pressure is applied to the air chamber via the first air channel to move the piston in a first direction, which to cause the tip of the valve rod to move along the axis toward or away from the nozzle for controlling liquid dispensing,
   wherein when the first and second voltage signals cause to close the first air channel and to open the second air channel, negative air pressure is applied to the air chamber to move the piston in a second direction opposite to the first direction, which to cause the tip of the valve rod to move along the axis toward or away from the nozzle for controlling liquid dispensing.

2. The liquid dispenser of claim 1, wherein the valve rod is configured to move toward the nozzle and then pressurize a valve seat of the nozzle for dispensing liquid as negative air pressure is applied to the air chamber to move the piston in the second direction.

3. The liquid dispenser of claim 1, further comprising a spring configured to apply a resilient force to the piston in the second direction such that the piston moves in the second direction by the resilient force in addition to the negative air pressure applied to the air chamber.

4. The liquid dispenser of claim 1, wherein the first and second voltage signals are configured to operate the first and second piezoelectric actuators to open the second air channel only while the first air channel is fully closed during normal operation.

5. The liquid dispenser of claim 4, wherein the first and second voltage signals are configured to operate the first and second piezoelectric actuators to open the first air channel only while the second air channel is fully closed during normal operation.

6. The liquid dispenser of claim 5, wherein the first and the first and second voltage signals are configured to operate the first and second piezoelectric actuators to fully close the first and second air channels between an opening period of the first air channel and an opening period of the second air channel during normal operation, wherein the opening period of the first air channel is a time span for which the first air channel is substantially open, and the opening period of the second air channel is a time span for which the second air channel is substantially open.

7. The liquid dispenser of claim 1, wherein the first and second voltage signals are configured to operate the first and second piezoelectric actuators such that the second piezoelectric valve opens and closes the second air channel at least two times while the first piezoelectric valve maintains full closing of the first air channel for a period between two immediately neighboring opening periods of the first air channel, wherein the opening period of the first air channel is a time span for which the first air channel is substantially open.

8. The liquid dispenser of claim 7, wherein the first and second piezoelectric actuators are configured to shrink to open the first and second air channels and expand to close the first and second air channels, respectively, wherein the first and second voltage signals are configured to operate the first and second piezoelectric actuators such that the second piezoelectric actuator shrinks and expands at least two times while the first piezoelectric actuator maintains expansion for fully closing the first air channel for the period.

9. The liquid dispenser of claim 7, wherein the opening period of the first air channel is longer than an opening period of the second air channel for which the second air channel is substantially open.

10. The liquid dispenser of claim 1, wherein the electric circuits comprises at least a processor configured to generated a signal for changing the first voltage signal to adjust a level of expansion and shrinkage of the first piezoelectric actuator when a displacement of the piezoelectric actuator is smaller than a reference value.

11. A method of dispensing liquid, the method comprising:
   providing the liquid dispenser of claim 1; and
   generating a first voltage signal for applying to the first piezoelectric actuator and a second voltage signal for applying to the second piezoelectric actuator, wherein the first and second voltage signals are to alternatingly open the first and second air channels without both being fully open at any time during normal operation; and applying the first and second voltage signals to the first and second piezoelectric actuators, respectively:

to open the first air channel and close the second air channel, thereby applying positive air pressure to the air chamber via the first air channel to move the piston in a first direction, which to cause the tip of the valve rod to move along the axis toward or away from the nozzle for controlling liquid dispensing, and further to open the second air channel and close the first air channel, thereby applying negative air pressure to the air chamber to move the piston in a second direction opposite to the first direction, which to cause the tip of the valve rod to move along the axis toward or away from the nozzle for controlling liquid dispensing.

12. The method of claim 11, wherein the valve rod moves toward the nozzle and then pressurizes a valve seat of the nozzle for dispensing liquid as negative air pressure is applied to the air chamber to move the piston in the second direction.

13. The method of claim 11, wherein the liquid dispenser further comprises a spring applying a resilient force to the piston in the second direction such that the piston moves in the second direction by the resilient force in addition to the negative air pressure applied to the air chamber.

14. The method of claim 11, wherein the first and second voltage signals are applied to operate the first and second piezoelectric actuators to open the second air channel only while the first air channel is fully closed during normal operation.

15. The method of claim 14, wherein the first and second voltage signals are applied to operate the first and second piezoelectric actuators to open the first air channel only while the second air channel is fully closed during normal operation.

16. The method of claim 15, wherein the first and the first and second voltage signals are applied to operate the first and second piezoelectric actuators to fully close the first and second air channels between an opening period of the first air channel and an opening period of the second air channel during normal operation, wherein the opening period of the first air channel is a time span for which the first air channel is substantially open, and the opening period of the second air channel is a time span for which the second air channel is substantially open.

17. The method of claim 11, wherein the first and second voltage signals are applied to operate the first and second piezoelectric actuators such that the second piezoelectric valve opens and closes the second air channel at least two times while the first piezoelectric valve maintains full closing of the first air channel for a period between two immediately neighboring opening periods of the first air channel, wherein the opening period of the first air channel is a time span for which the first air channel is substantially open.

18. The method of claim 17, wherein the first and second piezoelectric actuators shrink to open the first and second air channels and expand to close the first and second air channels, respectively, wherein the first and second voltage signals are configured to operate the first and second piezoelectric actuators such that the second piezoelectric actuator shrinks and expands at least two times while the first piezoelectric actuator maintains expansion for fully closing the first air channel for the period.

19. The method of claim 17, wherein the opening period of the first air channel is longer than an opening period of the second air channel for which the second air channel is substantially open.

20. The method of claim 11, further comprising generating a signal for changing the first voltage signal to adjust a level of expansion and shrinkage of the first piezoelectric actuator when a displacement of the piezoelectric actuator is smaller than a reference value.

* * * * *